(12) United States Patent
Suzuki et al.

(10) Patent No.: US 6,581,373 B2
(45) Date of Patent: Jun. 24, 2003

(54) VEHICLE WITH REDUCED EMISSION OF HARMFUL COMPONENT

(75) Inventors: Takashi Suzuki, Susono (JP); Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/961,067

(22) Filed: Sep. 24, 2001

(65) Prior Publication Data

US 2002/0052266 A1 May 2, 2002

(30) Foreign Application Priority Data

Oct. 27, 2000 (JP) ........................... 2000-328047
Jan. 12, 2001 (JP) ........................... 2001-004496

(51) Int. Cl.$^7$ ............................................. F01N 3/00
(52) U.S. Cl. ............................................. 60/285; 60/274
(58) Field of Search ................ 60/274, 285; 123/179.4

(56) References Cited

U.S. PATENT DOCUMENTS

| | | | |
|---|---|---|---|
| 3,650,345 A | * 3/1972 | Yardney | 180/65.2 |
| 5,319,921 A | 6/1994 | Gopp | 60/274 |
| 5,327,991 A | * 7/1994 | Yoshida | 180/65.4 |
| 5,492,190 A | 2/1996 | Yoshida | 150/65.4 |
| 5,566,774 A | 10/1996 | Yoshida | |
| 5,628,186 A | 5/1997 | Schmelz | |
| 5,785,137 A | * 7/1998 | Reuyl | 180/65.2 |
| 5,785,937 A | 7/1998 | Neufert et al. | |
| 5,842,341 A | 12/1998 | Kibe | |
| 5,845,487 A | 12/1998 | Fraenkle et al. | |
| 5,862,497 A | 1/1999 | Yano et al. | |
| 5,875,864 A | 3/1999 | Yano et al. | |
| 6,131,538 A | 10/2000 | Kanai | |
| 6,138,784 A | 10/2000 | Oshima et al. | |
| 6,173,569 B1 | * 1/2001 | Kusada et al. | 60/277 |
| 6,220,019 B1 | 4/2001 | Sugiura et al. | |
| 6,321,530 B1 | * 11/2001 | Hoshi et al. | 60/274 |
| 6,327,852 B1 | * 12/2001 | Hirose | 60/297 |
| 6,369,531 B1 | * 4/2002 | Oshima et al. | 318/139 |
| 6,425,365 B1 | * 7/2002 | Peters et al. | 123/198 DB |
| 6,467,458 B1 | * 10/2002 | Suzuki et al. | 123/491 |
| 6,504,259 B1 | * 1/2003 | Kuroda et al. | 290/40 C |

FOREIGN PATENT DOCUMENTS

| | | |
|---|---|---|
| JP | A 11-178111 | 7/1999 |
| JP | A 2000-54826 | 2/2000 |

* cited by examiner

Primary Examiner—Thomas Denion
Assistant Examiner—Diem Tran
(74) Attorney, Agent, or Firm—Oliff & Berridge, PLC

(57) ABSTRACT

An amount of oxygen accumulated in a catalytic converter after an engine stop by discontinuing a fuel supply to an engine is controlled to be within a preset range by controlling an engine speed into a preset range, controlling an engine revolution phase into a preset range, feeding air into the catalytic converter until the accumulated amount of oxygen becomes saturated, and controlling a catalytic converter temperature into a preset temperature range. Increase of an appropriate amount of the fuel at re-starting of the engine may prevent oxygen from deteriorating the NOx removing function without degrading an emission and the fuel efficiency.

23 Claims, 3 Drawing Sheets

VEHICLE WITH REDUCED EMISSION OF HARMFUL COMPONENT

INCORPORATION BY REFERENCE

The disclosure of Japanese Patent Applications No. 2000-328047 filed on Oct. 27, 2000 and No. 2001-004496 filed on Jan. 12, 2001 including the specification, drawings and abstract are incorporated herein by reference in its entirety.

BACKGROUND OF THE INVENTION

1. Field of Invention

The present invention relates to a technology for reducing emission of NOx from an internal combustion engine of a vehicle into the atmosphere.

2. Description of Related Art

Recently a catalytic converter having a three-way catalyst is installed in an automobile for reducing emission of harmful air pollutants such as NOx, HC and CO contained in an exhaust gas discharged from an engine of the automobile. The three-way catalyst has a function that promotes reaction among those pollutants to generate harmless components such as $N_2$, CO, and $H_2O$.

It has been proposed to temporarily stop an internal combustion engine of the automobile during an operation of the automobile, for the sake of savings of energy resources and environmental protection, when certain conditions under which the engine is allowed or desired to be temporarily stopped are established. In fact, this technology which is called "eco-running" has been implemented in some types of automobiles. The conditions for temporarily stopping the engine may be established when, for example, the vehicle stops at a red traffic light, or the vehicle stops or travels at a considerably low speed because of a traffic jam or the like. In a hybrid vehicle that is driven by a combination of an engine and an electric motor, the motor is operated to drive the vehicle by temporarily stopping the engine not only when the vehicle temporarily stops or travels at a considerably low speed but also when the vehicle travels in various operating states.

The catalytic converter including the catalyst for removing NOx in the exhaust system of the engine may cause a problem when the engine is temporarily stopped. The engine is generally stopped by discontinuing a fuel supply. The engine, however, will continue to be operated under the inertia for a while after discontinuing the fuel supply. During operation of the engine under the inertia, an oxygen-rich intake air is discharged into the catalytic converter that accumulates oxygen at every temporary stop of the engine. When the engine is started again in the aforementioned state, HC and CO flowing into the catalytic converter together with NOx will react with oxygen accumulated therein instead of causing the reaction between NOx and HC, CO to generate a harmless component $N_2$. As a result, NOx is not removed and then discharged into the atmosphere.

The aforementioned problem is particularly critical for operating an eco-running vehicle or a hybrid vehicle in which the engine is frequently stopped and re-started.

SUMMARY OF THE INVENTION

In view of the foregoing problem, it is an object of the invention to provide a vehicle in which deterioration in a NOx removal function of the catalytic converter owing to oxygen accumulated therein upon an engine stop can be prevented while suppressing emission of HC, CO, and the like.

To accomplish the above and/or other objects, the invention provides a vehicle that includes a power-train including an engine, a motor at least temporarily connected to the engine, a battery serving to supply power to the motor, and a generator selectively driven by at least the engine to charge the battery; a catalytic converter that purifies an exhaust gas from the engine; and a controller that controls fuel supply to the engine, determines whether an engine stop condition for stopping the engine is established and whether an engine re-start condition for re-starting the engine is established, on the basis of a traveling state of the vehicle, and discontinues the fuel supply to the engine when it is determined that the engine stop condition is established, and controls an engine speed such that an amount of oxygen accumulated in the catalytic converter during an engine stop is adjusted to be within a preset range, and re-starts the fuel supply for driving the engine when it is determined that the engine re-start condition is established, while temporarily increasing an amount of fuel supplied to the engine.

An operation of the engine may be controlled such that the engine speed upon discontinuation of the fuel supply is within a preset range.

The fuel supply may be discontinued when a revolution phase of the engine is within a preset range.

The engine speed may be controlled after discontinuation of the fuel supply to the engine such that an amount of oxygen to be accumulated in the catalytic converter during an engine stop is controlled to a saturated amount of oxygen that can be accumulated in the catalytic converter.

An operation of the engine may be controlled such that a temperature of the catalytic converter upon discontinuation of the fuel supply is within a preset range.

When the engine is stopped by discontinuing the fuel supply, the catalytic converter accumulates oxygen fed from the engine that races under the inertia after the discontinuation of the fuel supply. The amount of oxygen accumulated in the catalytic converter, however, may be controlled to be within a preset range for reaction with an appropriate amount of HC fed into the catalytic converter by temporarily increasing the amount of the fuel supply. As a result, deterioration in the NOx removing function of the catalytic converter owing to oxygen accumulated in the catalytic converter may be prevented while suppressing emission of HC through the catalytic converter. The additional fuel may be supplied at the same timing as a normal fuel supply timing, or may be supplied at a different timing.

The amount of oxygen fed and accumulated into the catalytic converter while racing of the engine after discontinuation of the fuel supply is determined by an engine speed when a fuel supply is discontinued. Accordingly, if the engine speed upon start of discontinuation of the fuel supply is controlled to be within a preset range prior to the discontinuation of the fuel supply, the amount of oxygen to be accumulated in the catalytic converter upon the engine stop may be controlled within a preset range more accurately. The aforementioned control to adjust the engine speed into the preset range may be executed by controlling an intake air of the engine, driving the engine by the motor, and suppressing the engine operation by the generator.

The amount of oxygen fed and accumulated into the catalytic converter while racing of the engine after discontinuation of the fuel supply is determined by a revolution phase of the engine when the fuel supply is discontinued. Accordingly if discontinuation of the fuel supply is controlled to start at a timing when the revolution phase of the engine falls within the preset range, the amount of oxygen fed and accumulated into the catalytic converter resulting from the engine racing after discontinuing the fuel supply can be controlled to be within the preset range.

If the amount of oxygen accumulated in the catalytic converter is controlled to a saturated amount, the accumulated amount is determined in accordance with a temperature of the catalytic converter. The amount of the accumulated oxygen at the engine stop, thus, can be accurately derived from the temperature of the catalytic converter. Accordingly, the amount of the accumulated oxygen can be controlled to be within the preset range by controlling the catalytic converter temperature.

The amount of oxygen accumulated into the catalytic converter may be changed depending on the catalytic converter temperature. In case of a high catalytic converter temperature, the accumulated amount of oxygen is increased. Therefore, the accumulated amount of oxygen may further be accurately controlled to be within the preset range by controlling the catalytic converter temperature in addition to the engine speed control or the engine revolution phase control. The catalytic converter temperature may be controlled by performing control of either a fuel supply amount, an intake air supply amount, an ignition timing, or a combination thereof.

BRIEF DESCRIPTION OF THE DRAWINGS

The foregoing and/or further objects, features and advantages of the invention will become more apparent from the following description of a preferred embodiment with reference to the accompanying drawings wherein.

DETAILED DESCRIPTION OF PREFERRED EMBODIMENTS

The invention will be described referring to the preferred embodiments.

Figure 1:
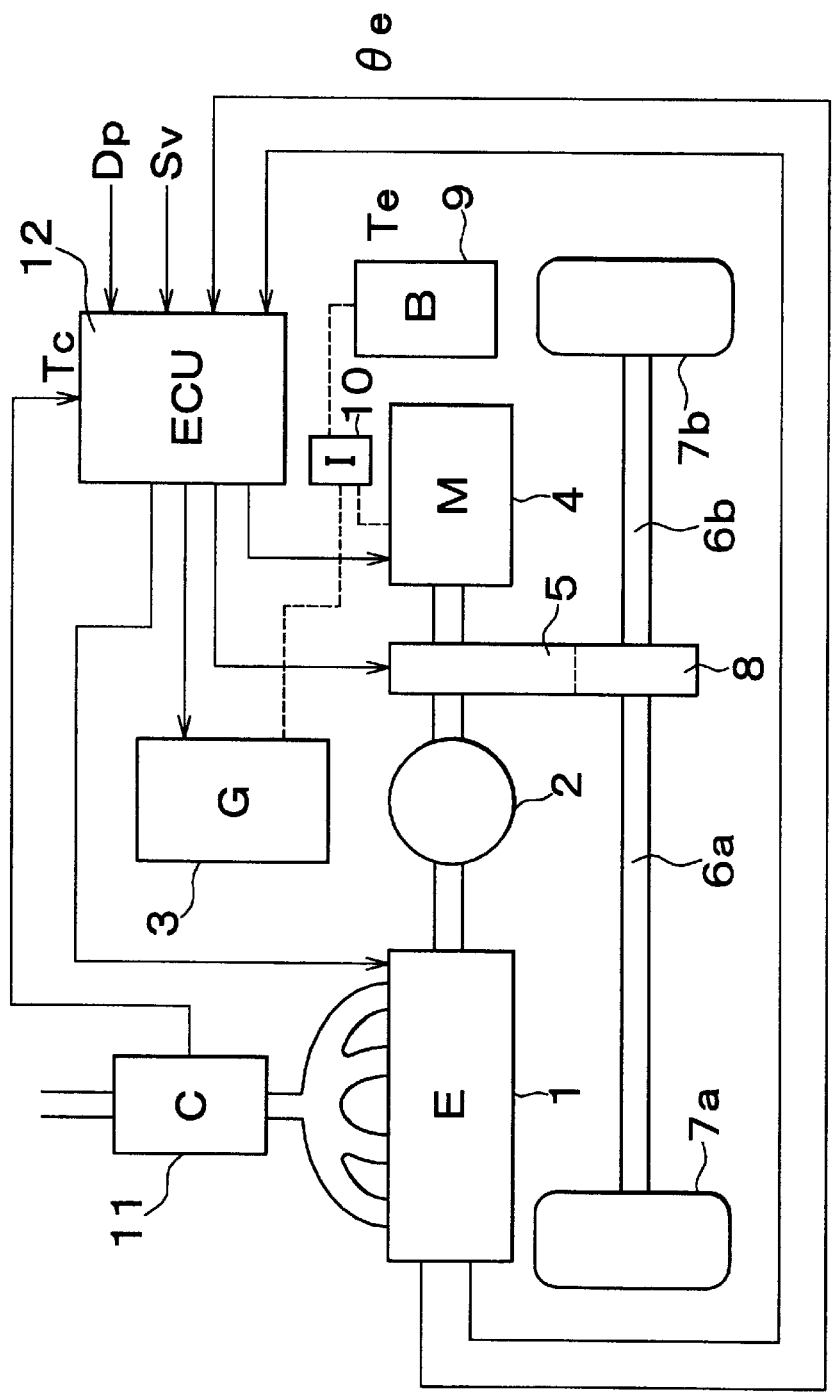
FIG. 1 is a view schematically showing the construction of a power-train system of a hybrid vehicle according to one preferred embodiment of the invention.

FIG. 1 schematically shows the construction of a power-train system employed in a hybrid vehicle according to one preferred embodiment of the invention. In FIG. 1, an internal combustion engine 1 is operatively connected to a generator 3 and a motor 4 via a drive coupling device 2 including a planetary gear set, such that power is transmitted among the engine 1, the generator 3 and the motor 4. The engine 1, the drive coupling device 2, the generator 3 and the motor 4 constitute a power-train for driving the hybrid vehicle. A transmission 5 is coupled to the power-train via a shaft of the motor 4. In operation, power is transmitted between the power-train of the engine 1, the generator 3, and the motor 4, and drive wheels 7a, 7b of the vehicle, via the transmission 5 and a pair of driving axles 6a, 6b. In the embodiment of FIG. 1, a differential gear system 8 is incorporated in the transmission 5, such that power for rotating the wheels 7a, 7b may be differentially transmitted to the driving axles 6a, 6b via the transmission 5.

A battery 9 is electrically connected to the generator 3 and the motor 4 via an inverter 10. The generator 3 functions to charge the battery 9 by generating power when the vehicle is driven under the inertia or by the engine 1 during deceleration. The motor 4 functions to drive the vehicle as needed, using the battery 9 as an electric power supply. While the generator 3 and the motor 4 are separately provided in the embodiment of FIG. 1, a so-called "motor/generator" as an integral device may be employed in place of the generator 3 and the motor 4. The motor/generator selectively functions as a motor or a generator, and the function of the motor/generator may be changed through switching of an electric circuit incorporated therein.

A catalytic converter 11 including a three-way catalyst is incorporated in an exhaust system of the engine 1 such that NOx, HC and CO contained in the exhaust gas discharged from the engine react with one another to generate harmless components such as $N_2$, $CO_2$, and $H_2O$. An electronic control unit (ECU) 12 functions to control the engine 1, generator 3, motor 4, and transmission 5 in a manner as described below such that the vehicle of reduced emission type of the invention can be operated. The ECU 12 receives signals concerning the operation of the invention indicating a depression amount of an accelerator pedal Dp, a vehicle speed Sv, a temperature Te of the engine 1, a revolution phase θe of an engine crankshaft, and a temperature Tc of the catalytic converter.

An operation of a vehicle of the invention with the construction as shown in FIG. 1 will be explained referring to a flowchart of FIG. 2.

Figure 2:
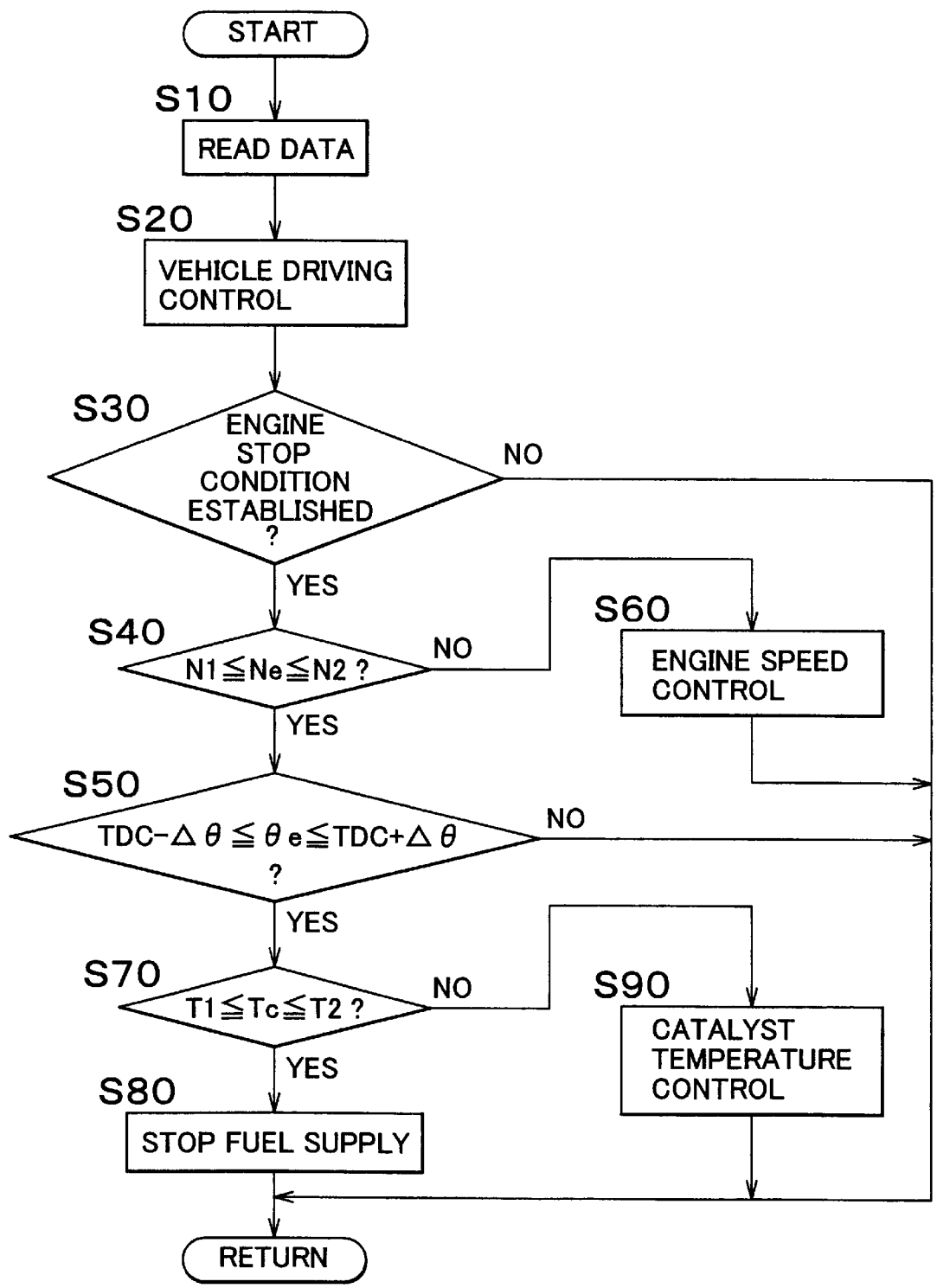
FIG. 2 is a flowchart illustrating one example of a combination of control schemes for stopping engine of a vehicle of the invention.

Upon start of the vehicle by turning on a key switch (not shown), required data for controlling are read in step S10 of the flowchart in FIG. 2. Then in step S20, driving of the vehicle is controlled on the basis of the data read in step S10. The control executed in step S20 includes a steering control and a vehicle speed control to be performed by a vehicle operator. In the course of the vehicle driving control reflected by the vehicle operator, the process proceeds to step S30 in which it is determined whether a condition that allows the engine stop during operation of the vehicle is established. The process returns to step S10 until YES is obtained in step S30.

The process proceeds to step S40 when it is determined in step S30 that a predetermined condition under which the engine is allowed or desired to temporarily stop is established. Examples of the predetermined condition may include stopping at a red traffic light for a time period exceeding a certain time length, running at a substantially low speed owing to a traffic jam, stopping the vehicle for a certain time period or longer or switching from the engine running mode to the motor running mode. In step S40, it is determined whether an engine speed Ne is within a preset range, i.e., $N1 \leq Ne \leq N2$. The Ne may range between, for example, 800−80 rpm (N1) and 800+80 rpm (N2). If YES is obtained in step S40, the process proceeds to step S50. If NO is obtained in step S40, the process proceeds to step S60. In step S60, the engine speed is controlled to be within a preset range by, for example, controlling at least one of a fuel supply amount and an air supply amount, applying a load of the generator 3 to the engine, using the motor 4 to accelerate the engine or performing a suitable combination of the aforementioned controls. The process then returns from step S60 to step S10 to execute the next cycle of the control routine, and in step S40, it is determined whether the engine speed is within the preset range again. The increase or decrease in the engine speed may be controlled in a stepped manner in a preferred embodiment.

In step S50, a moment when a phase angle θe of the crankshaft relative to one cylinder, e.g., the first cylinder, of the engine is within a range, that is, TDC±Δθ (Δθ: set as a very small angle) is detected. If such moment is detected, the process proceeds to step S70. The aforementioned detection of the moment based on which the fuel supply is discontinued, is only one of various embodiments.

In step S70, it is determined whether a catalytic temperature Tc of a catalytic converter is within a range between T1 and T2. The temperature T2 may be set to the value indicating a temperature limit above which an amount of oxygen accumulated in the catalyst becomes excessive. The temperature T2 may further be set to a value to which the catalytic temperature may be easily controlled by controlling the fuel supply amount, intake air amount, or an ignition timing. The temperature T1 may be set to an arbitrary value so long as an appropriate temperature range is obtained between the temperatures T1 and T2. If YES is obtained in step S70, the process proceeds to step S80 in which the fuel supply is discontinued. If NO is obtained in step S70, the process proceeds to step S90, in which the catalytic temperature is controlled to be within the preset range by controlling the fuel supply amount, intake air amount, or ignition timing. Like the engine speed control executed in step S60, the catalytic temperature control may be executed in a stepped manner by repeatedly executing the control routine until YES is obtained in step S70.

When the fuel supply is discontinued in step S80, the amount of oxygen accumulated in the catalytic converter 11 after the engine stop can be always controlled within a preset range. When the engine is re-started, additional fuel is supplied in order to feed appropriate amounts of HC and CO to the catalytic converter such that the controlled amount of oxygen can react with the HC and CO without deteriorating emission and fuel efficiency. As a result, the amount of the additional fuel to be temporarily added is determined such that removal of NOx cannot be prevented by the controlled amount of oxygen. The additional fuel supply may be performed by increasing the fuel at a normal fuel supply timing or supplying the additional fuel at a different fuel supply timing. The aforementioned fuel addition control is executed at re-starting of the engine in a temporary stopped state by the vehicle driving control in step S20.

The flowchart shown in FIG. 2 incorporates three possible control schemes. All those control schemes do not have to be executed to achieve the object of the invention. At least one of control schemes for controlling the engine speed to be within a preset range before discontinuing the fuel supply (S40 and S60) and for controlling the rotation phase of the engine to be within a preset range before discontinuing the fuel supply (S50) may be executed. The control scheme for controlling the catalytic temperature to be within a preset range before discontinuing the fuel supply (S70 and S90) may be combined with any one of the aforementioned control schemes, or may be omitted.

Upon stop of the engine after execution of the aforementioned control, an amount of oxygen accumulated in the catalytic converter is controlled by the engine speed Ne, the crank shaft angle phase θe, or combination thereof, or further the catalytic converter temperature. Therefore at re-starting of the engine, the amount of the fuel supplied to the engine may be temporarily increased such that the oxygen accumulated in the catalytic converter is reacted with HC and CO to be removed before reaction of the oxygen with NOx, HC, CO, respectively by the catalytic converter and an appropriate amount of HC and CO is fed to the catalytic converter.

Figure 3:
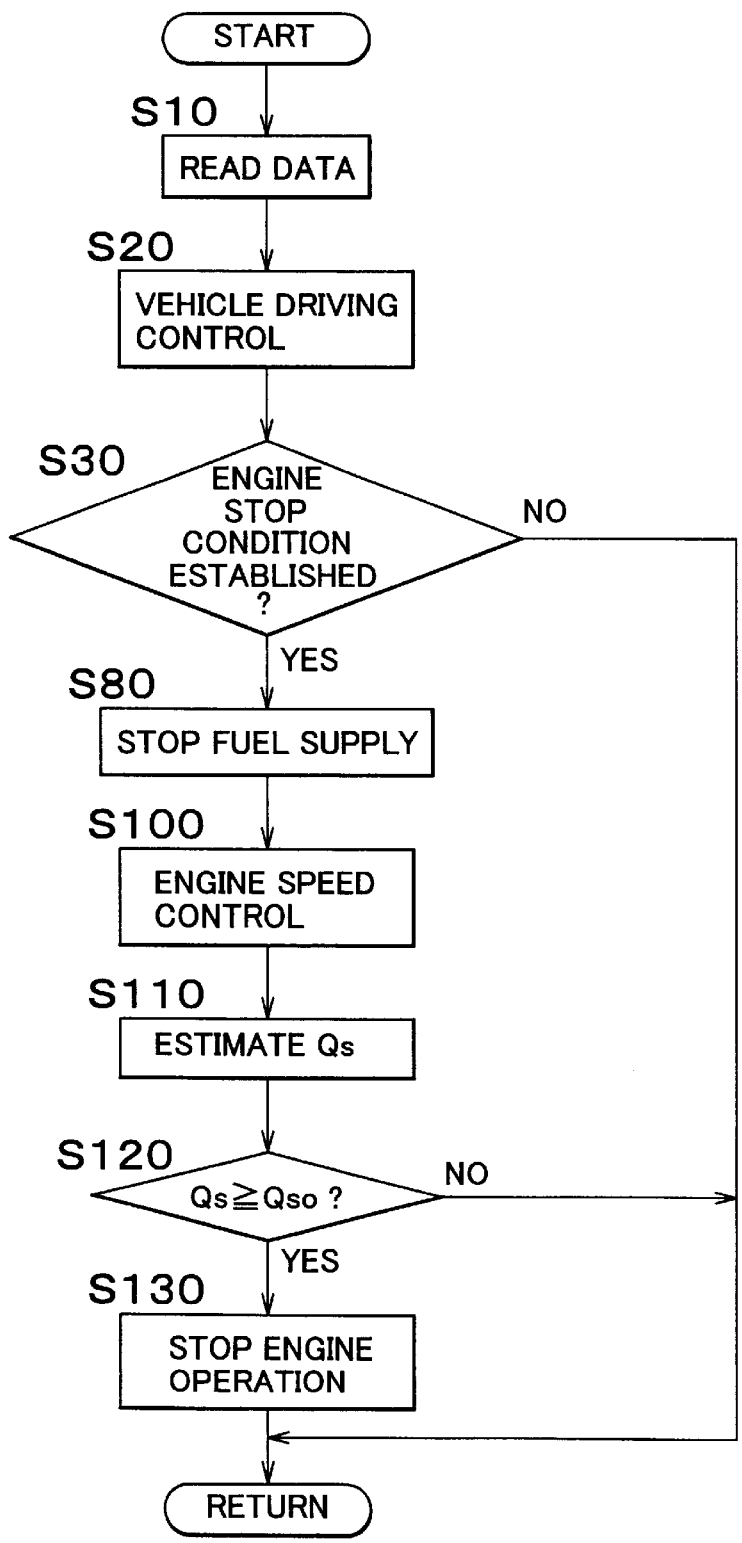
FIG. 3 is a flowchart illustrating another example of a combination of control schemes for stopping engine of a vehicle of the invention.

FIG. 3 shows a flowchart of another embodiment of the invention. In this flowchart, step of the control scheme which is the same as that shown in FIG. 2 will be designated with the same number of step shown in FIG. 2.

In this embodiment, when it is determined that the engine stop condition is established in step S30, the fuel supply is immediately discontinued in the subsequent step S80. Then the amount of oxygen to be accumulated in the catalytic converter after stopping of the engine is controlled. In step S100, the engine speed is controlled, and then in step S110, an oxygen amount Qs accumulated in the catalytic converter is estimated. The engine speed is controlled by stopping the engine operation under the inertia by controlling at least one of an intake throttle and a load of the generator, or by retarding the engine operation under the inertia by means of the motor. The engine speed after discontinuing the fuel supply can be obtained by the aforementioned engine speed control. Accordingly the oxygen amount to be accumulated in the catalytic converter after the engine stop may be estimated.

In step S120, it is determined whether the estimated oxygen amount Qs reaches a maximum oxygen amount that can be retained by the catalytic converter, that is, a saturated oxygen amount Qso. The saturated oxygen amount Qso is determined on the basis of the catalytic converter temperature Tc read in step S120. The process will return from step S120 to step S10 until YES is obtained in step S120. The control routine executes reading of the data and proceeds to step S100 and then to S110. If the estimated oxygen amount Qs reaches the saturated oxygen amount Qso, that is, YES is obtained in step S120, the process proceeds to step S130 in which an engine is stopped. The engine is stopped by operating the load of the generator 3 or the motor 4 reversely.

In this embodiment, upon stop of the engine, the amount of oxygen accumulated in the catalytic converter has reached the saturated oxygen amount determined on the basis of the catalytic converter temperature. So upon re-starting of the engine, appropriate amount of the additional fuel can be temporarily supplied such that the accumulated oxygen can be removed by reaction with HC and CO prior to reaction among NOx, HC and CO in the catalytic converter.

As embodiments of the invention have been described, it is clear for those skilled in the art that modification of those embodiments can be performed without departing from scope of the invention.

What is claimed is:

1. A vehicle, comprising:
    a power-train including an engine, a motor at least temporarily connected to the engine, a battery serving to supply power to the motor, and a generator selectively driven by at least the engine to charge the battery;
    a catalytic converter that purifies an exhaust gas from the engine; and
    a controller that
        controls fuel supply to the engine;
        determines whether an engine stop condition for stopping the engine is established and whether an engine re-start condition for re-starting the engine is established, on the basis of a traveling state of the vehicle; and
        discontinues the fuel supply to the engine when it is determined that the engine stop condition is established, and controls an engine speed such that an amount of oxygen accumulated in the catalytic converter during an engine stop is adjusted to be within a preset range; and re-starts the fuel supply for driving the engine when it is determined that the engine re-start condition is established, while temporarily increasing an amount of fuel supplied to the engine.

2. The vehicle according to claim 1, wherein the controller temporarily increases the amount of fuel such that a preset amount of HC is fed to the catalytic converter to prevent the accumulated oxygen from deteriorating a NOx removing function of the catalytic converter without being discharged from the catalytic converter.

3. The vehicle according to claim 1, wherein the controller controls an operation of the engine such that the engine speed upon discontinuation of the fuel supply is within a preset range.

4. The vehicle according to claim 1, wherein the controller discontinues the fuel supply when a revolution phase of the engine is within a preset range.

5. The vehicle according to claim 3, wherein the controller discontinues the fuel supply when a revolution phase of the engine is within a preset range.

6. The vehicle according to claim 1, wherein the controller controls an operation of the engine such that a temperature of the catalytic converter upon discontinuation of the fuel supply is within a preset range.

7. The vehicle according to claim 3, wherein the controller controls an operation of the engine such that a temperature of the catalytic converter upon discontinuation of the fuel supply is within a preset range.

8. The vehicle according to claim 4, wherein the controller controls an operation of the engine such that a temperature of the catalytic converter upon discontinuation of the fuel supply is within a preset range.

9. The vehicle according to claim 5, wherein the controller controls an operation of the engine such that a temperature of the catalytic converter upon discontinuation of the fuel supply is within a preset range.

10. The vehicle according to claim 1, wherein the controller controls the engine speed after discontinuation of the fuel supply to the engine.

11. The vehicle according to claim 10, wherein the controller controls the engine speed after discontinuation of the fuel supply to the engine such that an amount of oxygen to be accumulated in the catalytic converter during an engine stop is controlled to a saturated amount of oxygen that can be accumulated in the catalytic converter.

12. The vehicle according to claim 1, wherein the motor and the generator are integrated into a motor/generator.

13. A method for controlling emission of a harmful component discharged from an engine of a vehicle provided with a power-train including the engine, a motor at least temporarily connected to the engine, a battery serving to supply power to the motor, a generator selectively driven by at least the engine to charge the battery, and a catalytic converter that purifies an exhaust gas of the engine, the method comprising the steps of:

controlling fuel supply to the engine;

determining whether an engine stop condition for stopping the engine is established and whether an engine re-start condition for re-starting the engine is established, on the basis of a traveling state of the vehicle; and discontinuing the fuel supply to the engine when it is determined that the engine stop condition is established, and controlling an engine speed such that an amount of oxygen accumulated in the catalytic converter during an engine stop is adjusted to be within a preset range; and re-starting the fuel supply for driving the engine when it is determined that the engine re-start condition is established, while temporarily increasing an amount of fuel supplied to the engine.

14. The method according to claim 13, wherein the amount of fuel is temporarily increased such that a preset amount of HC is fed to the catalytic converter to prevent the accumulated oxygen from deteriorating a NOx removing function of the catalytic converter without being discharged from the catalytic converter.

15. The method according to claim 13, wherein an operation of the engine is controlled such that the engine speed upon discontinuation of the fuel supply is within a preset range.

16. The method according to claim 13, wherein the fuel supply is discontinued when a revolution phase of the engine is within a preset range.

17. The method according to claim 15, wherein the fuel supply is discontinued when a revolution phase of the engine is within a preset range.

18. The method according to claim 13, wherein an operation of the engine is controlled such that a temperature of the catalytic converter upon discontinuation of the fuel supply is within a preset range.

19. The method according to claim 15, wherein an operation of the engine is controlled such that a temperature of the catalytic converter upon discontinuation of the fuel supply is within a preset range.

20. The method according to claim 16, wherein an operation of the engine is controlled such that a temperature of the catalytic converter upon discontinuation of the fuel supply is within a preset range.

21. The method according to claim 17, wherein an operation of the engine is controlled such that a temperature of the catalytic converter upon discontinuation of the fuel supply is within a preset range.

22. The method according to claim 13, wherein the engine speed is controlled after discontinuation of the fuel supply to the engine.

23. The method according to claim 22, wherein the engine speed is controlled after discontinuation of the fuel supply to the engine such that an amount of oxygen to be accumulated in the catalytic converter during an engine stop is controlled to a saturated amount of oxygen that can be accumulated in the catalytic converter.

* * * * *